United States Patent Office 3,021,356
Patented Feb. 13, 1962

3,021,356
PROCESS FOR THE PRODUCTION OF
ALLYL 6-CYANOHEXANOATE
Benjamin T. Freure, Charleston, and Samuel W. Tinsley, South Charleston, W. Va., assignors to Union Carbide Corporation, a corporation of New York
No Drawing. Filed Oct. 20, 1959, Ser. No. 847,474
2 Claims. (Cl. 260—465.4)

This invention relates to a process for the production of allyl 6-cyanohexanoate and to the compound itself.

Many esters of 6-cyanohexanoic acid are known; however, to our knowledge the unsaturated ester, allyl 6-cyanohexanoate, has not heretofore been disclosed. This ester is of importance because it is a valuable intermediate which is readily and easily prepared by the process of this invention. The novel compound of this invention finds utility as a polymerizable monomer for the production of polymers and copolymers of allyl 6-cyanohexanoate. It is also useful as a plasticizer, and can be hydrogenated to produce a viscous polycondensate which is useful as a lubricant or plasticizer.

Allyl 6-cyanohexanoate is produced by reacting an allyl halide, such as allyl fluoride, allyl chloride, or allyl bromide, with an alkali metal salt of 6-cyanohexanoic acid, such as lithium 6-cyanohexanoate, sodium 6-cyanohexanoate, or potassium 6-cyanohexanoate. The alkali metal salts of 6-cyanohexanoic acid can themselves be prepared by the careful hydrolysis of the esters of 6-cyanohexanoic acid.

The reaction of the allyl halide with the alkali metal salt of 6-cyanohexanoic acid can be carried out in the absence of or in the presence of an inert organic diluent which serves as a solvent for the reactive intermediates. The liquid organic solvents which can be employed are those which are inert and non-reactive with the starting materials. The preferred organic diluents are the lower alcohols, such as methanol, ethanol, n-propanol, isopropanol, butanol, and the like; also suitable are the inert liquid ketones, for example acetone and the like.

The ratio of alkali metal 6-cyanohexanoate to allyl halide charged can vary over wide ranges. From practical considerations, however, a range of from about 1:1 to about 1:5 can be employed; with a range of from about 1:2 to about 1:3 preferred.

The reaction is preferably carried out in the presence of a catalyst, which is present to the extent of from about 0.1% to about 3% by weight based on the total weight of reactants charged. The preferred catalyst concentration is from about 0.25% to about 1.5% by weight. Among the catalysts which can be used are the organic amines such as the aliphatic and aromatic tertiary amines, for example, triethylamine, trihexylamine, triphenylamine, etc. The preferred tertiary amines, however, are the aliphatic tertiary amines containing from 1 to about 12 or more carbon atoms in each alkyl radical.

A pressure of from about 50 p.s.i.g. to about 500 p.s.i.g. or higher can be used to influence the reaction rate, with pressures of from about 75 p.s.i.g. to about 150 p.s.i.g. preferred. The temperature of the reaction is preferably maintained between about 75° C. and 150° C., with the most preferred range being between about 80° C. and 125° C. At temperatures below those indicated, the reaction is too slow, while at temperatures above those indicated, decomposition products will form.

In a typical example, 384 grams of sodium 6-cyanohexanoate, 460 grams of allyl chloride, 100 grams of methanol, and 6 grams of triethylamine were charged to a stainless steel autoclave. The autoclave was sealed and the mixture was heated at 86° C. to 88° C. for 10 hours at a pressure of 75 p.s.i.g., and then cooled, removed from the autoclave, and filtered. The filtrate was vacuum distilled and 275 grams of allyl 6-cyanohexanoate was recovered boiling at 113° C. to 120° C. at a pressure of 0.55 mm. to 0.60 mm. of mercury. The allyl 6-cyanohexanoate was identified by infrared spectrum and by elemental analysis; calculated for $C_{10}H_{15}O_2N$: C, 66.2; H, 8.33; found: C, 66.2; H, 8.39. A chemically pure sample had the following properties: boiling point of 113° C.–115° C. at 0.55 mm.; $d$ 20/15.6 of 0.990; and $n$ 30/D of 1.4457.

In a similar manner allyl 6-cyanohexanoate is produced by substitution of potassium 6-cyanohexanoate for the sodium salt used above. Also, the same product is formed by substitution of allyl bromide for allyl chloride in either of the above examples.

The allyl 6-cyanohexanoate was readily converted to a viscous polymeric product by heating in the presence of hydrogen at 130° C. and 1000 p.s.i.g. This viscous product is useful as a lubricant.

What is claimed is:

1. A process for producing allyl 6-cyanohexanoate which comprises reacting an allyl halide, selected from the group consisting of allyl fluoride, allyl chloride, and allyl bromide, with an alkali metal salt of 6-cyanohexanoic acid in contact with an amine catalyst at from about 75° C. to about 150° C. at a pressure of from about 50 p.s.i.g. to about 500 p.s.i.g.

2. A process for producing allyl 6-cyanohexanoate which comprises reacting allyl chloride with sodium 6-cyanohexanoate in an inert organic diluent and in contact with an amine catalyst at from about 80° C. to about 125° C. at a pressure of from about 75 p.s.i.g. to about 150 p.s.i.g.

References Cited in the file of this patent

UNITED STATES PATENTS 2,624,751     Mowry et al.  ----------- Jan. 6, 1953

OTHER REFERENCES

Wagner and Zook: "Synthetic Organic Chemistry," 1953, page 484.